United States Patent
Bikouo Njangang et al.

(10) Patent No.: US 11,762,854 B2
(45) Date of Patent: Sep. 19, 2023

(54) EXTENDED CACHING AND QUERY-TIME VALIDATION

(71) Applicant: AMADEUS S.A.S., Biot (FR)

(72) Inventors: Gilles Aubin Bikouo Njangang, Antibes (FR); Stephane Rodriguez, Antibes (FR); Francois-Joseph Mytych, Le Rouret (FR); Thierry Blaszka, La Colle sur Loup (FR); Jean-Philippe Aubry, Sudbury, MA (US); Sami Gharbi, Antibes (FR)

(73) Assignee: AMADEUS S.A.S., Biot (FR)

( * ) Notice: Subject to any disclaimer, the term of this patent is extended or adjusted under 35 U.S.C. 154(b) by 139 days.

(21) Appl. No.: 17/005,863

(22) Filed: Aug. 28, 2020

(65) Prior Publication Data
US 2021/0073228 A1   Mar. 11, 2021

(30) Foreign Application Priority Data
Sep. 5, 2019   (FR) ...................... 1909794

(51) Int. Cl.
*G06F 16/2453* (2019.01)
*G06F 16/2455* (2019.01)
(Continued)

(52) U.S. Cl.
CPC ... *G06F 16/24539* (2019.01); *G01C 21/3446* (2013.01); *G01C 21/3492* (2013.01);
(Continued)

(58) Field of Classification Search
CPC ............... G06F 9/54; G06F 16/24539; G06F 16/24578; G06F 16/24552; G01C 21/00; G06Q 10/08355
See application file for complete search history.

(56) References Cited

U.S. PATENT DOCUMENTS 7,430,641 B2   9/2008   Zohar et al.
8,161,264 B2   4/2012   Arimilli et al.
(Continued)

FOREIGN PATENT DOCUMENTS

EP   2908255 A1   8/2015
EP   2911070 B1   10/2016
(Continued)

*Primary Examiner* — Sherief Badawi
*Assistant Examiner* — William P Bartlett
(74) *Attorney, Agent, or Firm* — Perry + Currier

(57) ABSTRACT

In a distributed computing environment comprising a frontend system with a search platform having a cache of pre-computed search results and a backend system with one or more data-bases and a validation instance, a request is received at the search platform from a client comprising one or more first key-values indicating a first data record and at least a first pre-computed search result and a second pre-computed search result for the first data record is retrieved from the cache. The validation instance evaluates a current validity of the first pre-computed search result and the second pre-computed search result retrieved from the cache and returns the first pre-computed search result to the client device, or in response to evaluating that the first pre-computed search result is invalid and the second pre-computed search result is valid, returns the second pre-computed search result to the client.

8 Claims, 11 Drawing Sheets

(51) Int. Cl.
  *G06F 16/2457* (2019.01)
  *G01C 21/34* (2006.01)
  *G01C 21/36* (2006.01)

(52) U.S. Cl.
  CPC ... *G01C 21/3617* (2013.01); *G06F 16/24552* (2019.01); *G06F 16/24578* (2019.01)

(56) References Cited

U.S. PATENT DOCUMENTS

| | | | | |
|---|---|---|---|---|
| 9,489,306 | B1* | 11/2016 | Murugesan | G06F 12/0891 |
| 2008/0275629 | A1* | 11/2008 | Yun | G08G 1/096844 |
| | | | | 701/118 |
| 2012/0330941 | A1* | 12/2012 | Liu | G06F 16/24578 |
| | | | | 707/723 |
| 2014/0074403 | A1* | 3/2014 | Shin | G08G 1/096844 |
| | | | | 701/537 |
| 2014/0146965 | A1* | 5/2014 | Kremp | H04L 9/3271 |
| | | | | 380/44 |
| 2016/0127219 | A1* | 5/2016 | Akhavain Mohammadi | |
| | | | | H04L 41/22 |
| | | | | 709/224 |
| 2016/0171008 | A1* | 6/2016 | Ciabrini | G06F 16/24552 |
| | | | | 707/609 |
| 2016/0342650 | A1* | 11/2016 | Damm | H04L 67/2842 |
| 2016/0379168 | A1* | 12/2016 | Foerster | G06Q 10/063116 |
| | | | | 705/7.16 |
| 2017/0126840 | A1* | 5/2017 | Luna | H04L 47/822 |
| 2017/0344484 | A1 | 11/2017 | Pack, III | |
| 2018/0348010 | A1* | 12/2018 | Coleman | G01C 21/3492 |

FOREIGN PATENT DOCUMENTS

| | | |
|---|---|---|
| FR | 3077146 A1 | 7/2019 |
| WO | WO-0146865 A1 | 6/2001 |
| WO | WO-2019145480 A1 | 8/2019 |

* cited by examiner

| Origin | Destination | Path comb. number | Going over data center number | Sig. prop. delay (arb. units) | Bandwidth (arb. units) | Key-parameter 5 |
|---|---|---|---|---|---|---|
| N. America | Asia | 1 | 3 (Europe) | 10 | 10000 | Key-value 5-1 |
| N. America | Asia | 31 | 4 (Africa) | 11 | 10 | Key-value 5-2 |
| N. America | Asia | 5 | 5 (Australia) | 23 | 1000 | Key-value 5-3 |
| N. America | Asia | 2 | 6 (S. America) | 21 | 1000 | Key-value 5-4 |
| Australia | S. America | 200 | 3 (Europe) | 200 | 5000 | Key-value 5-5 |
| Australia | S. America | 220 | 4 (Africa) | 1500 | 10 | Key-value 5-6 |
| Australia | S. America | 202 | 2 (Asia) | 100 | 5000 | Key-value 5-2 |
| Australia | S. America | 231 | 1 (N. America) | 1000 | 5000 | Key-value 5-4 |

FIG. 3

| Number of path combination | Rank | Signal propagation delay (in arbitrary units) | Going over data center number |
|---|---|---|---|
| path combination #1 | 1 | 10 | 3 (Europe) |
| path combination #31 | 2 | 11 | 4 (Africa) |
| path combination #2 | 3 | 21 | 6 (S. America) |
| path combination #5 | 4 | 23 | 5 (Australia) |
| path combination #4 | 5 | 50 | X |
| path combination #6 | 6 | 55 | Y |
| path combination #101 | 7 | 101 | Z |

FIG. 4

| Number of path combination | Rank | Signal progagation delay (in arbitrary units) | Going over data center number |
|---|---|---|---|
| ~~path combination #1~~ | ~~1~~ | ~~10~~ | ~~3 (Europe)~~ |
| path combination #31 | 2 | 11 | 4 (Africa) |
| path combination #2 | 3 | 21 | 6 (S. America) |
| path combination #5 | 4 | 23 | 5 (Australia) |
| path combination #4 | 5 | 50 | X |
| path combination #6 | 6 | 55 | Y |
| path combination #101 | 7 | 101 | Z |

FIG. 6

| Number of path combination | Rank | Signal propagation delay (in arbitrary units) | Going over data center number |
|---|---|---|---|
| path combination #1 | 1 | 10 | 3 (Europe) |
| ~~path combination #31~~ | ~~2~~ | ~~11~~ | ~~4 (Africa)~~ |
| path combination #2 | 3 | 21 | 6 (S. America) |
| path combination #5 | 4 | 23 | 5 (Australia) |
| path combination #4 | 5 | 50 | X |
| path combination #6 | 6 | 55 | Y |
| path combination #101 | 7 | 101 | Z |

FIG. 7

| Number of path combination | Rank | Signal progagation delay (in arbitrary units) | Going over data center number |
|---|---|---|---|
| ~~path combination #1~~ | ~~1~~ | ~~10~~ | ~~3 (Europe)~~ |
| ~~path combination #31~~ | ~~2~~ | ~~11~~ | ~~4 (Africa)~~ |
| path combination #2 | 3 | 21 | 6 (S. America) |
| path combination #5 | 4 | 23 | 5 (Australia) |
| path combination #4 | 5 | 50 | X |
| path combination #6 | 6 | 55 | Y |
| path combination #101 | 7 | 101 | Z |

FIG. 10

EXTENDED CACHING AND QUERY-TIME VALIDATION

CROSS-REFERENCE TO RELATED APPLICATION

This application claims priority from French patent application no. 1909794, filed Sep. 5, 2019, the contents of which is incorporated herein by reference.

FIELD

The disclosure of the present invention generally relates to computers and computer software, and in particular to methods, systems, and computer program product that handle search queries in a database system and perform cache update adaptation.

BACKGROUND

Recent developments in database technology show that it is a common issue to ensure short response times to search queries which require processing large volumes of data. For example, such processing has to be performed in response to so-called "open queries" which contain only little input information (e.g., only one or two parameters out of a dozen possible parameters are specified and/or the specified value ranges of the parameters are broad) and, consequently, generally lead to a large number of results. Possibilities to speed up data processing by increasing hardware performance are limited. Thus, attention is drawn to improving the operating mechanisms underlying the processing of large data volumes.

One general approach to shorten response times to queries is to pre-compute or pre-collect results to search queries and maintain them in a cache. Search queries are then actually not processed on the large volumes of original data stored in data bases, but on the results as maintained in the cache.

Caching, however, has a drawback, namely that the results maintained in the cache may become outdated due to changes in the original data from which the results have been pre-computed or pre-collected. So, it is an issue to keep the pre-computed or pre-collected results up-to-date in order to ensure that queries responded by the results from the cache correctly reflect the corresponding underlying data stored in the databases. Keeping the results held in the cache up-to-date is a tradeoff between competing technical parameters such as computational and transmission load, computational speed, data availability, storage capacity (of both, cache and main memories) on one side and the required validity and completeness of data on the other side. So, strategies for keeping the cache up-to-date, that is keeping the results maintained in the cache up-to-date, are needed.

U.S. Pat. No. 7,430,641 B2 provides a data storage system including a plurality of controllers and a cache memory connected or otherwise associated with one or more mass data storage devices. The controllers include a communication module and are associated with one or more mass data storage devices, wherein a first controller is adapted to cause a second controller to retrieve a data block associated with a logical unit by transmitting a signal to the second controller via their respective communication modules. The first controller is adapted to signal one or more other controllers whether it has received one or more data block requests. At least one prefetch decision module is adapted to trigger the retrieval of data blocks based on data block requests received by a controller with which it is associated and/or based on data block requests received by other controllers.

U.S. Pat. No. 8,161,264 B2 describes a method for performing data prefetching using indirect addressing that includes determining a first memory address of a pointer associated with a data prefetch instruction. Content, that is included in a first data block of a memory, at the first memory address is then fetched. An offset is then added to the content of the memory at the first memory address to provide a first offset memory address. A second memory address is then determined based on the first offset memory address. A second data block that includes data at the second memory address is then fetched. A data prefetch instruction may be indicated by a unique operational code, a unique extended opcode, or a field in an instruction.

SUMMARY

According to a first aspect, a method for handling data in a distributed computing environment is provided. The distributed computing environment comprises a frontend system with a search platform having a cache of pre-computed search results and a backend system with one or more databases and a validation instance. The one or more databases store data records having a combination of at least one key parameter, wherein each key parameter has a key value out of a finite number of predefined key values. The cache hosts, for at least a part of the data records, at least two pre-computed search results out of a set of search results for a given data record which are computable based on the key value of the at least one key parameter of the given data record. The method comprises, at the search platform, receiving a request from a client device comprising one or more first key-values indicating a first data record. The method retrieves, in response to receiving the request, from the cache at least a first pre-computed search result and a second pre-computed search result for the first data record. The method evaluates, by inquiring the validation instance, a current validity of the first pre-computed search result and the second pre-computed search result retrieved from the cache. In response to evaluating that at least the first pre-computed search result is valid, the method returns the first pre-computed search result to the client device. In response to evaluating that the first pre-computed search result is invalid and the second pre-computed search result is valid, the method returns the second pre-computed search result to the client device.

In some embodiments, the set of search results comprises a set of ordered search results, wherein the set of ordered search results comprises at least a first-ranked search result and a second-ranked search result and the at least two pre-computed search results comprise at least the first-ranked search result and the second-ranked search result, wherein the first pre-computed search result is the first-ranked search result and the second pre-computed search result is the second-ranked search result from the set of ordered search results for the given data record.

In some embodiments, the search platform returns, in response to evaluating that the first pre-computed search result is invalid an indication that the first pre-computed search result is currently invalid.

In some embodiments, the search platform deletes the first pre-computed search result from the cache in response to evaluating that the first pre-computed search result is invalid, and/or deletes the second pre-computed search result from the cache in response to evaluating that the second pre-computed search result is invalid.

In some embodiments the search platform returns an invalidity indication to the client in response to evaluating that all pre-computed search results retrieved from the cache in response to receiving the request are invalid.

According to some embodiments, the evaluation of the validity of the first pre-computed search result and the second pre-computed search result comprises transmitting the key-value of the at least one key-parameter to the validation instance.

According to some embodiments, the frontend system comprises a cache manager, the method further comprising at the cache manager triggering a pre-computation of at least two pre-computed search results for a given data record in response to determining that a probability that at least the first pre-computed search result or the second pre-computed search result stored at the cache is outdated exceeds a given threshold.

In some embodiments, determining that a probability that at least the first pre-computed search result or the second pre-computed search result stored at the cache is outdated exceeds a given threshold comprises calculating an aging value given by $$e^{-C(t-t0)}$$

wherein t denotes a current time or the estimated time of receipt of the first and/or second pre-computed search result at the cache, C denotes an aging rate modelled by a probabilistic model and t0 a timestamp indicating the time when the first and/or the second pre-computed search result was precomputed. The aging value is compared with a given threshold value determining that the first pre-computed search result and/or the second pre-computed search result is likely outdated if the aging value is below the given threshold value.

In some embodiments, the pre-computation is triggered in response to evaluating that the first pre-computed search result and/or the second pre-computed search result is invalid.

According to some embodiments, the pre-computation comprises indicating to the backend system that the first pre-computed search result and/or the second pre-computed search result is invalid and replacing the first pre-computed search result from the set of search results for the given data record and/or the second pre-computed search result from the set of search results for the given data record by further search results for the given data record.

According to still another aspect a computing machine is provided, the computing machine acting as a search platform for handling data in a distributed computing environment comprising a frontend system with a search platform having a cache, a backend system with one or more databases storing data records having a combination of at least one key parameter, wherein each key parameter has a key value out of a finite number of predefined key values, and a validation instance, the search platform being arranged to execute the method of any one of the aforementioned aspects.

According to still another aspect, a computer program is provided, the computer program product comprising program code instructions stored on a computer readable medium to execute the method steps according to any one of the aforementioned aspects, when said program is executed on a computer.

The present mechanisms will be described with reference to accompanying figures. Similar reference numbers generally indicate identical or functionally similar elements.

BRIEF DESCRIPTIONS OF THE DRAWINGS

Embodiments are described with reference to the following figures.

FIG. 3 is an example of possible worldwide path connections as described herein.

FIG. 4 is a schematic depiction of a set of ordered pre-computed search results stored in the cache.

FIG. 6 is a schematic depiction of a set of ordered pre-computed search results stored in the cache wherein the first-ranked search result has been deleted.

FIG. 7 is a schematic depiction of a set of ordered pre-computed search results stored in the cache wherein the second-ranked search result has been deleted.

FIG. 10 is a schematic depiction of a set of ordered pre-computed search results stored in the cache wherein the first-ranked and second-ranked search result have been deleted and re-placed with lower-ranked search results.

DETAILED DESCRIPTION

Figure 1:
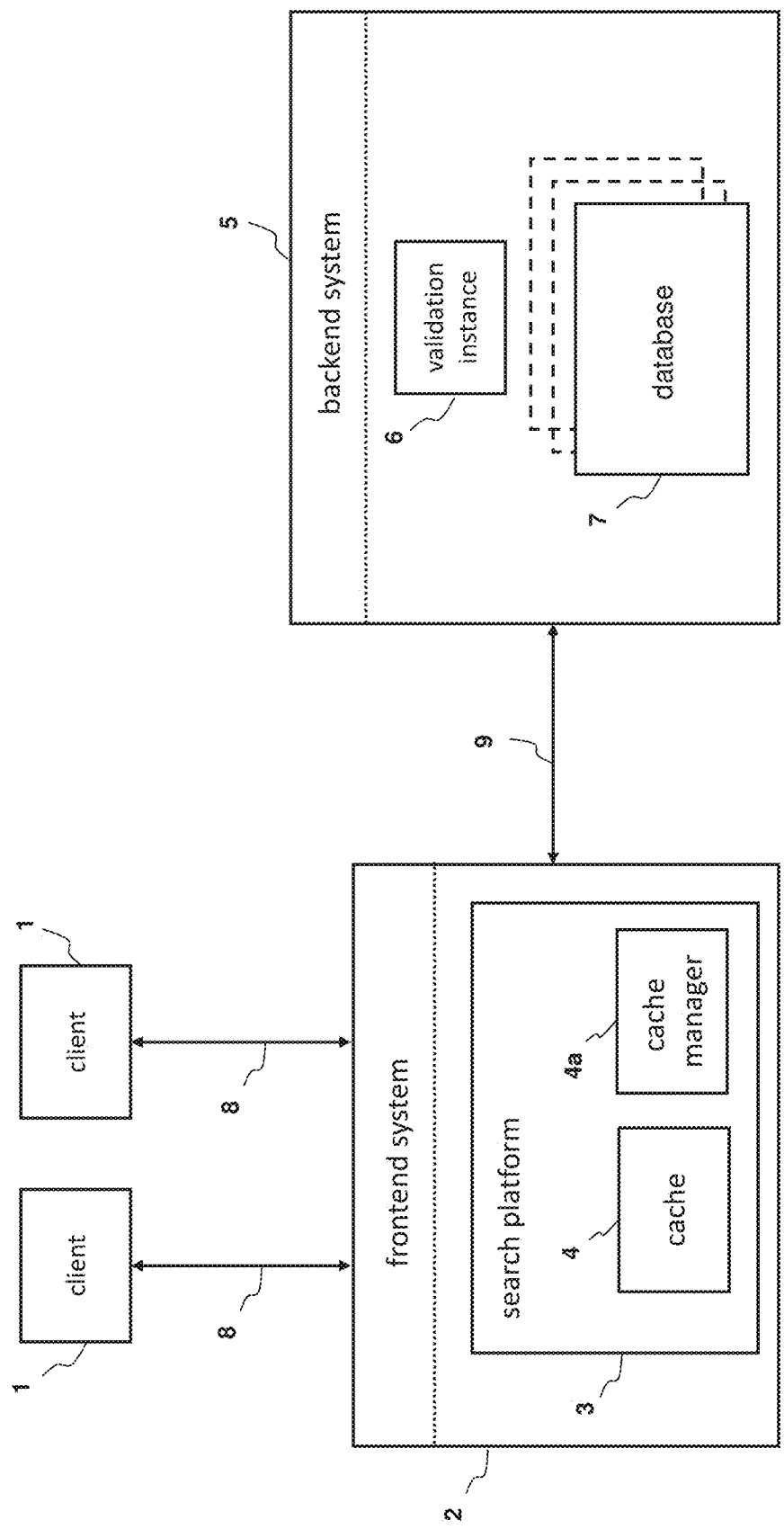
FIG. 1 is a schematic depiction of a distributed computer environment as described herein.

The subject disclosure generally pertains to handling queries in a distributed computing system as shown in FIG. 1. The distributed computing system comprises one or more clients 1, a frontend system 2 with a search platform 3 having a cache 4 with pre-computed or pre-collected search results stored therein and a backend system 5 with one or more databases 7 and a validation instance 6. Frontend system 2 may also comprise of a cache manager 4a. Clients 1, frontend system 2 and backend system 5 are located anywhere and are individual computing machines such as personal computers, mobile stations such as laptops or tablet computers, smartphones, and the like, as well, in some embodiments, more powerful machines such as database application servers, distributed database systems respectively comprising multiple interconnected machines, data centers, etc. In some embodiments, the frontend system 2 and/or the backend system 5 might be similar machines as the clients 1, while, in other embodiments, the frontend system 2 and/or the backend system 5 are more powerful than the clients 1. In one embodiment, the frontend system 2 and/or the backend system 5 and the clients 1 are data centers which may be worldwide distributed.

Figure 11:
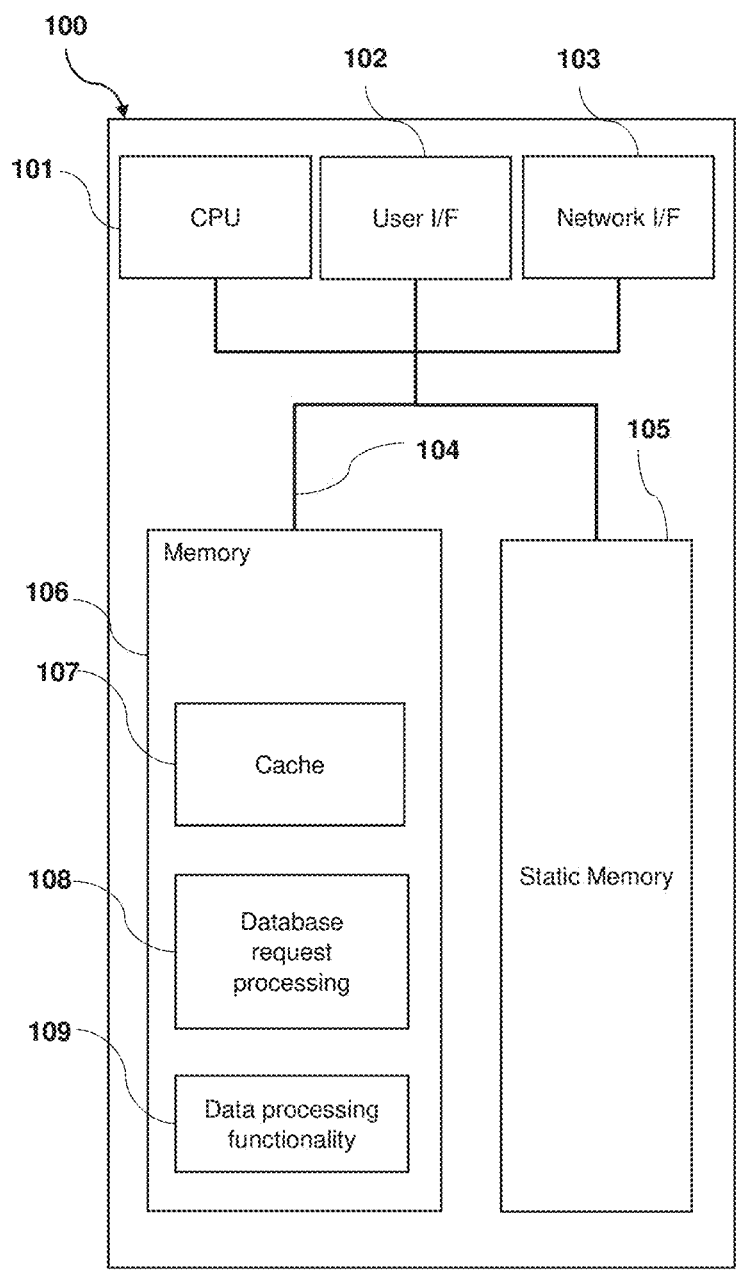
FIG. 11 is a diagrammatic representation of the internal components of a computing machine as described herein.

Frontend system 2, backend system 5 and the clients 1 may be constituted of several hardware machines depending on performance requirements. Both, frontend system 2, backend system 5 and clients 1, are embodied e.g. as stationary or mobile hardware machines comprising computing machines 100 as illustrated in FIG. 11 and/or as specialized systems such as embedded systems arranged for a particular technical purpose, and/or as software components running on a general or specialized computing hardware machine (such as a web server and web clients).

Frontend system 2, backend system 5 and the clients 1 are interconnected by the communication interfaces 8 and 9. Each of the interfaces 8 and 9 utilizes a wired or wireless Local Area Network (LAN) or a wireline or wireless Metropolitan Area Network (MAN) or a wire-line or wireless Wide Area Network (WAN) such as the Internet or a combination of the aforementioned network technologies and are implemented by any suitable communication and network protocols.

Database queries which are requested from client 1 over the communication interface 8 are received at search platform 3. Search platform 3 may implement standardized communication protocols across the layers of the OSI reference model. Amongst others, the search platform 3 may employ initial processing mechanisms such as error recognitions and corrections, packet assembly, as well as determination whether a valid database query has been received. Invalid messages may be discarded already by the search platform 3 for reasons of security and performance.

The cache 4 may be implemented as a further database (in addition to the one or more databases 7). In some embodiments, the cache 4 may also be a logical cache, i.e. the data of the cache 4 is held in respectively assigned areas of a memory of the hardware machine(s) which host(s) one or more databases 7. Cache 4 stores the pre-computed or pre-collected path combinations derived from the underlying data stored in one or more databases 7.

Backend system 5 comprises a validation instance 6 for determining the validity of data, e g. the pre-computed or pre-collected results stored in cache 4. Within the context of the example, validation instance 6 examined whether one or more path combinations are currently available.

The one or more databases 7 store data which is generally up-to-date and, thus, forms original or valid data. The one or more databases 7 may be equipped with an interface to update the data stored in the databases 7. This interface may be the same as the interface to receive and respond to database queries. The data stored by the databases 7 is continuously kept updated which means that any change of the data is actually effected in the databases 7, e.g. on an event-based or periodic basis. Hence, the databases 7 is either an original data source itself, such as an inventory database or a database maintaining any kind of original and generally valid results, or accesses one or more original data sources in order to store original results in identical (mirror) or processed form. If the databases 7 generates/computes/collects the original results by accessing other/further original data sources in order to prepare original results, the databases 7 provides results which generally accurately reflect the current content of the original response data.

The methods presented in the subsequent embodiments are applicable for all database systems and computing systems with a hardware or functional architecture as shown in FIG. 1 or with a similar architecture.

Figure 2:
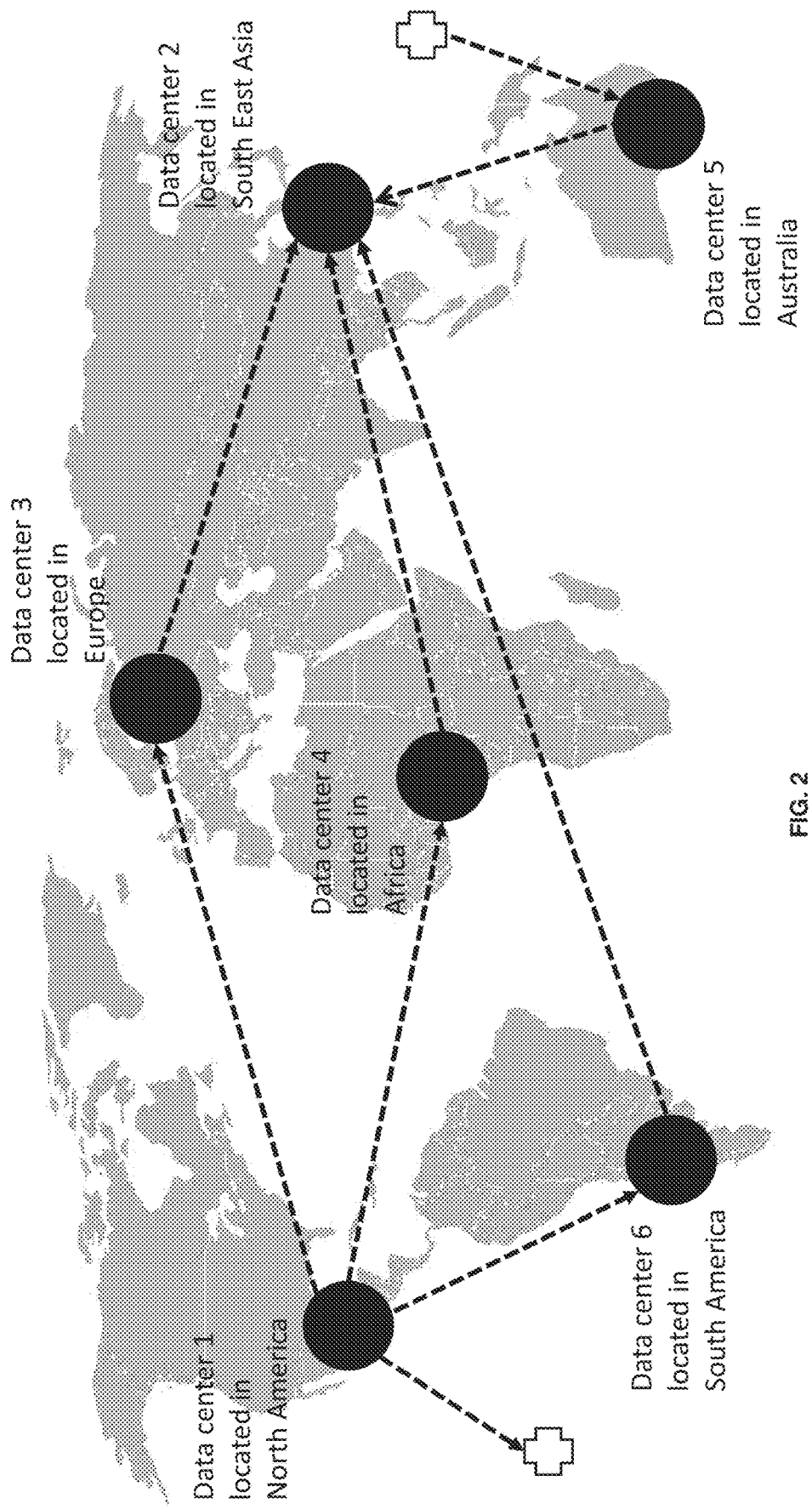
FIG. 2 is schematic depiction of a worldwide distributed network of data centers, being an exemplar use case for the mechanisms described herein.

An example for pre-computed or pre-collected results as aforementioned in the preceding paragraphs are the possible path combinations connecting data centers (or nodes) in a distributed network as shown in FIG. 2. The network comprises of millions of data centers distributed worldwide and also comprise of millions of possible paths connecting these data centers. The total number of data centers and paths are fixed. The paths are associated, among others, with certain signal propagation delays and certain bandwidths. Within the context of this example, a data base exists comprising as stored data the available, worldwide distributed data centers, the currently existing paths between these data centers, the associated signal propagation delays and bandwidths and information whether a data center is currently in an operational state. Using this data as underlying data, path combinations connecting the worldwide distributed nodes are pre-calculated or pre-collected and stored in cache 4, which can be queried by client 1 intending to transmit data from one data center to another.

If, within the context of this example and FIG. 2, client 1 intends to transmit huge amounts of data, e. g. from data center 1, located at a place in North America to data center 2, located at a place in South East Asia, then the user usually wishes to choose a path combination which would transmit the data as fast and as efficient as possible. This could e. g. mean to keep the signal propagation delay as low as possible.

An appropriate cache-based search of all possible pre-computed or pre-collected paths for the transmission of data results e. g. in a path going over data center 3, located at a place in Europe, which provides the lowest signal propagation delay. Within the context of this example, however, a validation performed on this search results reveals that data center 3 is currently non-operational at the moment when the data ought to be transmitted. Therefore, the path going over data center 3 is not usable for the transmission of data. Therefore, the search has resulted in an invalid result.

The pre-computed or pre-collected path combinations stored in the cache 4 have to be re-computed in order to yield updated path combinations for the cache 4. Once the re-computation has been completed, a new search requested by client 1 results in a path combination connection data center 1 with data center 2 over data center 4, located in Africa. The signal propagation delay is higher, however, this path combination over data center 4 currently provides the best available option, since the more better path combination going over data center 3 is currently non-operational. Within this context, the cache 4 was re-computed and the search was repeated by client 1, resulting in an additional computational load and additional traffic load on the computational system.

The one or more databases 7 store data records having a combination of at least one key parameter, wherein each key parameter has a key value out of a finite number of pre-defined key values. The data records comprise of tables with underlying data from which possible global network connections can be pre-computed. Key-parameters comprise parameters such as "origin" and "destination", meaning the site of the data centers transmitting and receiving data respectively. Further key-parameters comprise e. g. signal propagation delays, bandwidth as well as any further parameters such as distance, latency etc., which within this context may be generally denoted as "Key-parameter 5", "Key-parameter 6" etc.

The key-values, taken from a finite number of predefined key-values may be e. g. for the key-parameters "origin" and "destination" taken from the range "Africa, Asia, Europe, North America, South America, Australia". The key-values for the key-parameter "Signal propagation delay (measured in arbitrary units)" may be taken out from the range between 10 and 1500. The key-values for the key-parameter "Bandwidth" may be taken out from the range between 1 and 10000, which within this example are also given in arbitrary units. In general, key-values for a key-parameter denoted e. g. as "key-parameter X" may be taken from e. g. a range "key-value X-1 to Key-value X-Y".

From the underlying data the possible worldwide path combinations connecting two data centers are pre-computed as search-results and stored in cache 4. As an example shown in FIG. 3 the possible path combinations between data center 1 located in North America and data center 2 located in Asia may be:

path combination #1 going over data center 3 located in Europe path combination #31 going over data center 4 located in Africa path combination #5 going over data center 5 located in Australia path combination #2 going over data center 6 located in South America The numbering of the path combinations does not have to be uniform or in a sequential manner. Other path combinations may be e. g. path combinations connecting data center 5 located in Australia with data center 6 located in South America. Possible path combinations are for example:

path combination #200 going over data center 3 located in Europe path combination #220 going over data center 4 located in Africa path combination #202 going over data center 2 located in Asia path combination #231 going over data center 1 located in North America Each of the possible path combinations may have a specific signal propagation delay and—as an example for a further parameter—a specific bandwidth, which may serve as a basis for a possible ranking of the path combinations. These ranked path combinations may then form ranked pre-computed search results including a first-ranked search-result and a second-ranked search-result. FIG. 4 shows a table with a set of ranked and ordered search results, which may be a SQL-table hold by cache 4, comprising in total seven ranked path combinations taken from path combinations pre-computed earlier by search platform 3. The table displays in its columns the number and the rank of the path combinations, the individual signal propagation delays of the path combinations and the data center numbers over which the path combinations go (or are directed). The ranking has been based on signal propagation delays, wherein the first-ranked search result is the path combination #1 having the lowest signal propagation delay, which should be assigned a value '10' within this example. The second ranked search result may be the path combination #31 with the second lowest signal propagation delay, which should be assigned a value '11' within the current example. As shown in FIG. 4, the numbers of the path combinations do not have to coincide with the ranking. When inspecting FIG. 4, one finds out that e. g. path combination #31 has been ranked to the second place.

Cache 4 hosts, for at least a part of the data records, at least two pre-computed search results out of a set of search results for a given data record which are computable based on the key value of the at least one key parameter of the given data record. Within the current example, a pre-computed search result comprises of a path combination connecting two data centers, e. g. data center 1 located in North America and data center 2 located in South East Asia. The connection between these two data centers can be either directly or over at least one additional data center. All the possible connections between data center 1 and data center 2 form a set of search results, which within the context of the current example, are calculated based on at least one key-value of the key-parameter "Signal propagation delay", resulting in a value for the signal propagation delay, which may be used for a subsequent ranking of the search results, as shown in FIG. 4. A first pre-computed search result may be a path combination #1 connecting data center 1 with data center 2 going over data center 3 located in Europe and possessing the lowest signal propagation delay with a value of '10'. A second pre-computed search result may be a path combination #31 connecting data center 1 with data center 2 going over data center 4 located in Africa possessing a higher signal propagation delay with a value of '11'. If the first search result is invalid since e. g. data center 3 in Europe is not operational, a client 1 sending a request to search platform 3 may prefer to receive instead of the first search result the second pre-computed search result, which is valid since data center 4 is operational, although the signal propagation delay may be higher.

Figure 5:
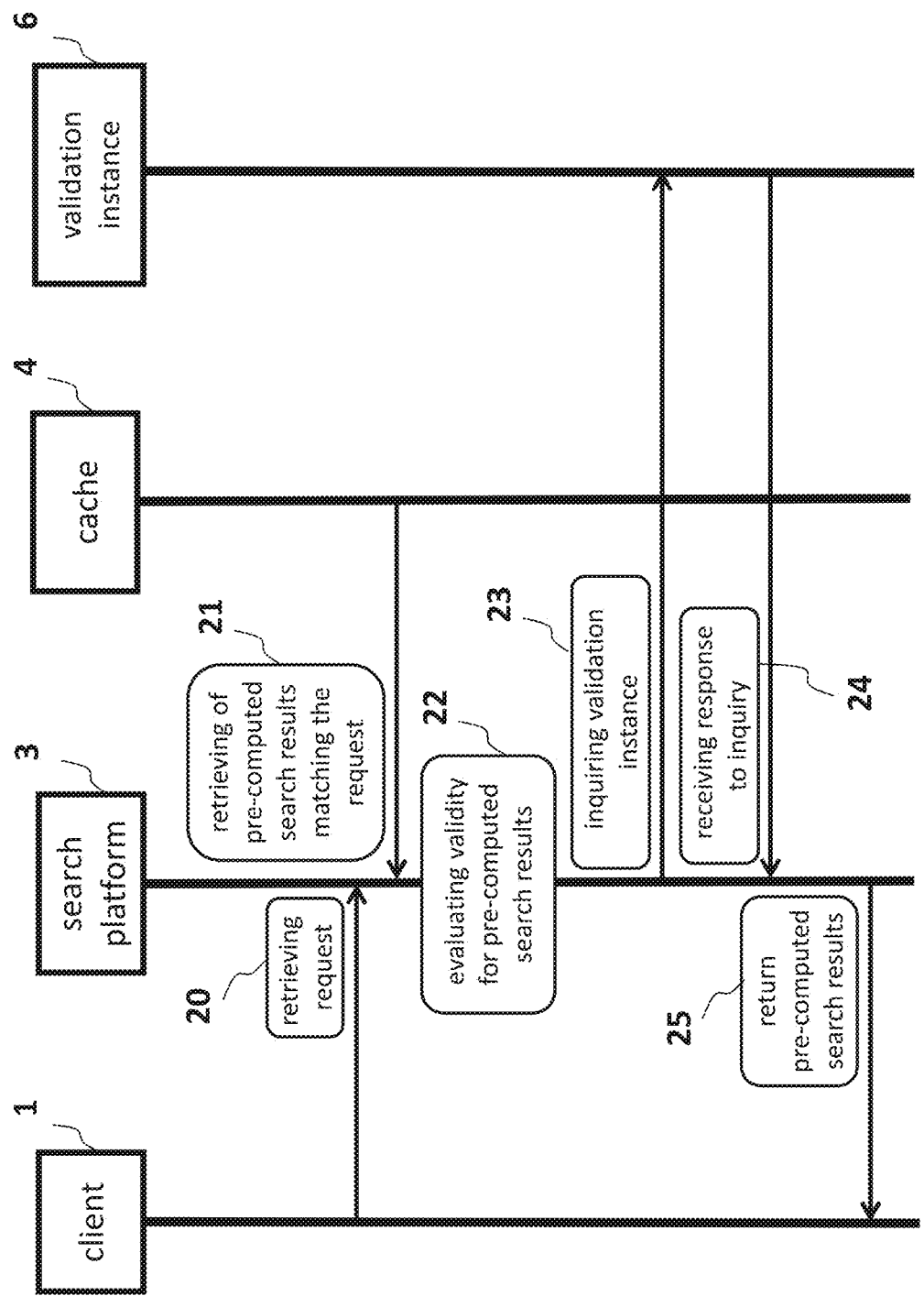
FIG. 5 is a sequence diagram for the processing of client requests at the search platform.

A message sequence diagram for the processing of client requests at the search platform 3 is shown in FIG. 5 according to some embodiments. Search platform 3 receives in an activity 20 a request from a client device 1 comprising one or more first key-values indicating a first data record. A request can be, in some embodiments, formulated as request written in SQL-language and directed to a SQL-database (wherein SQL stands for structures query language). Within the context of the current example, the request is for a data connection line and the one or more first key-values comprise key-values related to the key-parameters "Origin" and "Destination", such as "North America" and "Asia" respectively. Search platform 3 retrieves, in response to receiving the request, in an activity 21 from the cache 4 at least a first pre-computed search result and a second pre-computed search result for the first data record. These pre-computed search-results may be in form of SQL-tables as shown in FIG. 4. To cite again the current example, the first pre-computed search result may be the aforementioned path combination #1 connecting data center 1 with data center 2 going over data center 3 located in Europe, possessing the lowest signal propagation delay with a value of '10', and the second pre-computed search result may be the aforementioned path combination #31 connecting data center 1 with data center 2 going over data center 4 located in Africa possessing higher signal propagation delay with a value of '11'.

In an activity 22, search platform 3 evaluates, by inquiring in an activity 23 the validation instance 6, a current validity of the first pre-computed search result and the second pre-computed search result retrieved from the cache. In response to inquiring the validation instance 6, search platform 3 receives in an activity 24 information concerning the validity of the corresponding search-results. The evaluation of a validity of a search-result may comprise the evaluation whether a record stored in a SQL-table as shown in FIG. 4 may still be valid. To stay within the current example, the evaluation may comprise to find out whether the data centers 3 and 4 are currently in an operational or non-operational state. If one of the data centers 3 and 4 are in a non-operational state, path combinations going over that data centers 3 and 4 are as well in a non-operational state meaning that it is currently impossible to transmit data over that path combinations. The corresponding validity evaluated by search platform 3 may therefore be valued '0', therefore rendering the corresponding search result invalid. On the other hand, when the path combination is operational and data can be transmitted over that path combination, the validity calculated by search platform may be '1', resulting in that the corresponding search result is rendered valid.

In addition to evaluating whether a search results is valid or invalid and returning respective indications to the search platform, in some embodiments, the validity instance 6 may also return updated key-values for one or more key-parameters for the pre-computed data records indicated by the search platform 3. This may result in a reordering of the ranking of the search results based on the one or more updated key-values, such as, e. g. the signal propagation delays of path combinations #1 and #31. For example, due to current high load on the section between data center 1 and data center 3, the validation instance 6 may return for path combination #1 a current much lower value than '10000' for the bandwidth, which would result in a new and lower ranking of the originally first-ranked path combination #1. In response to this, path combination #31 may be assigned the new rank of first-ranked search-result.

In response to evaluating that at least the first pre-computed search result is valid, search platform 3 returns in activity 25 the first pre-computed search result to the client device 1, or in response to evaluating that the first pre-computed search result is invalid and the second pre-computed search result is valid, search platform 3 returns the second pre-computed search result to the client device 1. Within some embodiments, the search-results may be a SQL-table. To remain within the context of the current example, search platform returns to client 1 the path combination going over data center 3 in the case data center 4 is in a non-operational state or search platform returns to client 1 the path combination going over data center 4 in the case data center 3 is in a non-operational state. These search-results may e. g. be returned as an SQL-table comprising of just one row.

The computation of a two-part answer to the request by client 1, i. e. of an alternative second search result in addition to the first search-result eliminates the problem of re-computing the entire cache in the case the first search result is invalid, therefore reducing the computational load of the entire computing system (frontend system, backend system) as well as the transmission load, since the number of requests for underlying data stored in databases serving as bases for the re-computation of search results is also reduced. This is contrary to the prior art described in the background section as well as in U.S. Pat. Nos. 7,430,641 B2 and 8,161,264 B2, which either present only one search result or does not address the presentation of search-results at all. In addition, client 1 receives the pre-computed search-results in response the request in a shorter time, since the second search result is already hold by cache 4 and therefore client 1 does not has to wait until an entire re-computation of cache 4 in order to yield the second search-result has been completed.

According to some embodiments, the set of search results comprising a set of ordered search results, wherein the set of ordered search results comprises at least a first-ranked search result and a second-ranked search result and the at least two pre-computed search results comprise at least the first-ranked search result and the second-ranked search result, wherein the first pre-computed search result is the first-ranked search result and the second pre-computed search result is the second-ranked search result from the set of ordered search results for the given data record. Cache 4 holds at least two pre-computed search results comprising at least the first-ranked search result and the second-ranked search result, in the case of the present example the first ranked path combination #1 and the second ranked path combination #31. The first pre-computed search result is path combination #1, which is simultaneously the first-ranked search result and the second pre-computed search result is path combination #31, which is the second-ranked search result from the set of ordered search results for the given data record, as shown in table in FIG. 4.

According to some embodiments, the search platform 3, returns, in response to evaluating that the first pre-computed search result is invalid an indication that the first pre-computed search result is currently invalid. The indication can comprise a message displayed on a suitable website such as a corporate website, a message sent by email, an instant messaging service, SMS etc. Staying within the current example, search platform 3 may return to client 1 a message that path combination over data center 3 is currently not in an operational state.

According to some embodiments, the search platform 3, deletes the first pre-computed search result from cache 4 in response to evaluating that the first pre-computed search result is invalid, and/or deletes the second pre-computed search result from cache 4 in response to evaluating that the second pre-computed search result is invalid. In the case of an SQL-table, this may be equivalent to deleting the first and/or the second row of the table. Citing again the current example, search platform 3 deletes in FIG. 6 path combination #1 in the case path combination #1, representing the connection between data center 1 and data center 2 over data center 3 located in Europe, is non-operational and therefore invalid (having a validity of '0'). In an analog case, if the connection between data center 1 and data center 2 over data center 4 in Africa is non-operational and therefore invalid, search platform 3 deletes path combination #31, as shown in FIG. 7.

According to some embodiments, search platform 3, returns an invalidity indication to client 1 in response to evaluating that all pre-computed search results retrieved from the cache in response to receiving the request are invalid. The invalidity indication can comprise a message displayed on a suitable website such as a corporate website, a message sent by email, an instant messaging service, SMS etc. If, within the context of the example, all seven path combinations listed in FIG. 5 are non-operational due to a failure of a node such as a data center, then to client 1 a message is returned that currently there is no connection possible between data center 1 in North America and data center 2 in South East Asia and therefore, no data can be transmitted at the moment.

According to some embodiments, the evaluation of the validity of the first pre-computed search result and the second pre-computed search result comprises transmitting the key-value of the at least one key-parameter to the validation instance. In the case of a SQL-table, a record stored in the table may be transmitted. Within the current example, search platform 3 transmits the key-values for the key-parameters "origin" and "destination", e. g. the key-values "North America" and "Asia", to the validation instance 6. At the validation instance 6, the possible path combinations connecting data center 1 and data center 2 are validated and, in the case that a path combination, e. g. path combination #1 going over data center 3 located in Europe, is not available for data transmission, that path combination gets assigned a validity of '0'.

Figure 8:
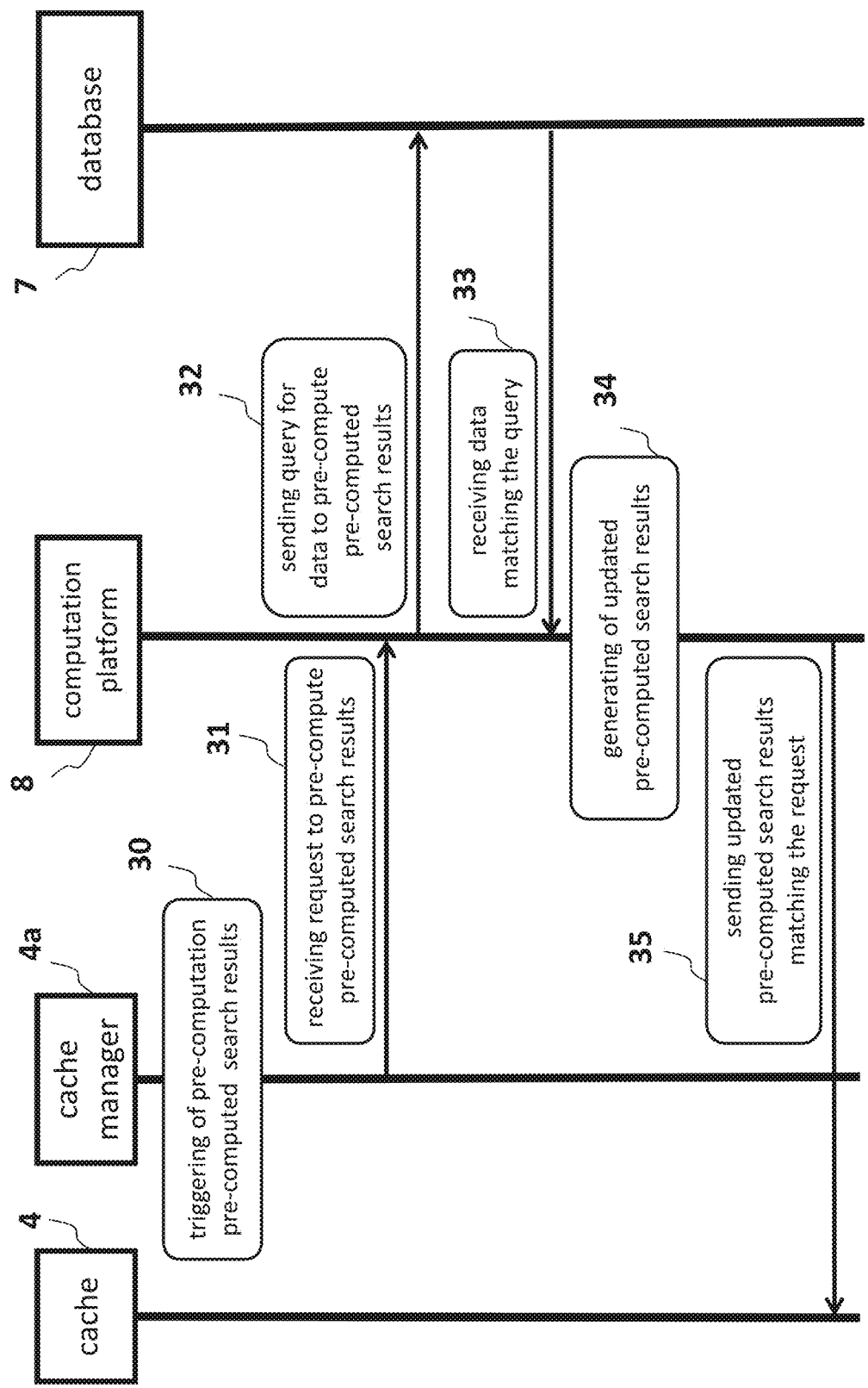
FIG. 8 is a sequence diagram for the population of cache 4 according with updated pre-computed search results.

In some embodiments and as aforementioned, frontend system 2 comprises of a cache manager 4*a*. In some further embodiments, the method further comprises at the cache manager 4*a* triggering a pre-computation of at least two pre-computed search results for a given data record in response to determining that a probability that at least the first pre-computed search result or the second pre-computed search result stored at the cache is outdated exceeds a given threshold. In the case of an SQL-table, at least two rows will be re-computed. Within the current example, in FIG. 8 a message sequence diagram for the population of cache 4 according with updated pre-computed search results is shown. In an activity 30, cache manager 4a triggers the pre-computation (or re-computation) of the possible world-wide path combinations after cache manager 4a has determined that the probability that the path combinations currently hold in cache 4 is outdated exceeds a given threshold. Computation platform 8 receives in an activity 31 a request to pre-compute (or re-compute) the path combinations. In order to perform this, computation platform 8 sends in an activity 32 a query to one or more databases 7 for the underlying data necessary to pre-compute the path combinations. In an activity 33, computation platform receives the corresponding data from the data records and in an activity 34, computation platform 8 generates the updated world-wide path-combinations connecting two data centers. In an activity 35, computation platform 8 sends to cache 4 the updated pre-computed path combinations.

According to some embodiments, determining by the cache manager 4a that a probability that at least the first pre-computed search result or the second pre-computed search result stored at the cache is outdated exceeds a given threshold comprises calculating an aging value given by $$e^{-C(t-t0)}$$

wherein t denotes a current time or the estimated time of receipt of the first and/or second pre-computed search result at the cache, C denotes an aging rate modelled by a probabilistic model and t0 a timestamp indicating the time when the first and/or the second pre-computed search result was precomputed, e. g. the path combination #1 connecting data center 1 with data center 2 over data center 3 located in Europe and/or path combination #31 connecting data center 1 with data center 2 over data center 4 located in Africa respectively.

Figure 9:
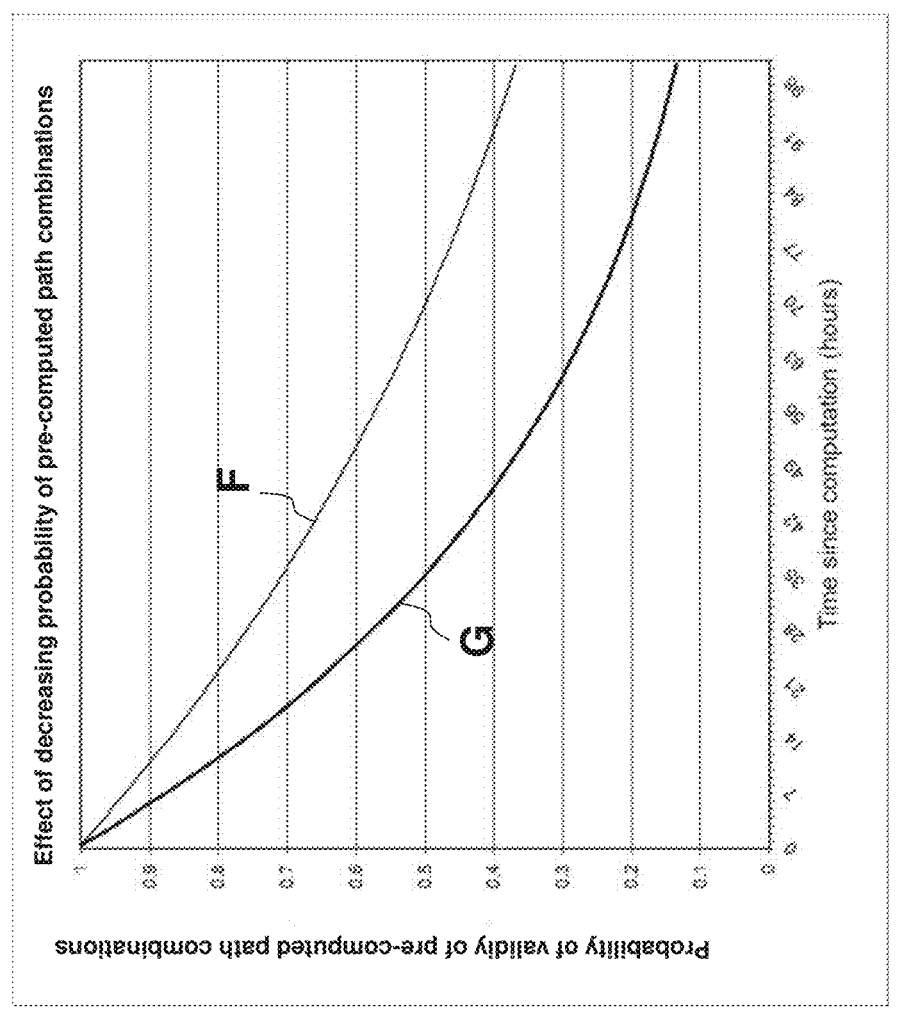
FIG. 9 shows exemplary functions of the probable accuracy of pre-computed search-results decreasing over time as described herein.

The aging rate C may be employed to provide an estimate of the probability for the pre-computed path combinations to stay valid after a given time. This is also referred as the probability of the path combinations being valid or, in other words, not being outdated. Two exemplary functions of this probable validity decreasing over time are depicted by FIG. 9. Function F represents path combinations which potentially remains more accurate (or, more correctly, stays at a higher probability of being valid over time) than another path combination associated with function G. For example, the path combinations represented by function F has a roughly 70% probability of being still valid at 35 hours after its last generation, while the other path combinations characterized by function G is only valid up to about 50% at 35 hours after its latest generation. The cache manager 4a compares the validity probability value for e. g. path combination #1 connecting data center 1 with data center 2 over data center 3 located in Europe or path combination #31 connecting data center 1 with data center 2 over data center 4 located in Africa with a given threshold value and determines that the requested data is likely invalid if the validity probability value is below the given threshold value.

Cache manager 4a compares the aging value with a given threshold value and determines that the first pre-computed search result and/or the second pre-computed search result, e. g. path combination #1 connecting data center 1 with data center 2 over data center 3 located in Europe or path combination #31 connecting data center 1 with data center 2 over data center 4 located in Africa, is likely outdated if the aging value is below the given threshold value.

According to some embodiments, the pre-computation is triggered in response to evaluating that the first pre-computed search result and/or the second pre-computed search result is invalid. To stay within the current example, if the evaluation at validation instance 6 results that path combination #1 representing the connection between data center 1 and data center 2 over data center 3 located in Europe, is non-operational and therefore invalid (having a validity of '0') and/or path combination #31 representing the connection between data center 1 and data center 2 over data center 4 in Africa is non-operational and therefore invalid (having a validity of '0'), cache manager 4a triggers in activity 30 of FIG. 8 the pre-computation the possible world-wide path combinations.

According to some embodiments, the pre-computation comprises indicating to the backend system that the first pre-computed search result and/or the second pre-computed search result is invalid and replacing the first pre-computed search result from the set of search results for the given data record and/or the second pre-computed search result from the set of search results for the given data record by further search results for the given data record. Taking again the case of an SQL-table, this may be equivalent to a reordering of the rows of the table. FIG. 10 shows for the present example the replacement of both, path combination #1, representing the connection between data center 1 and data center 2 over data center 3 located in Europe, and path combination #31, representing the connection between data center 1 and data center 2 over data center 4 located in Africa, with lower ranking path combinations. In FIG. 10, path combination #2 is placed in the position of the first-ranked search result and path combination #5 is placed in the combination of the second-ranked search-result.

Another example for the application of the methodologies described herein is navigation-related and refers to a computation of a route between two locations. If a car-driver wishes e. g. to know the shortest connection between Central Park in New York City and the J. F. Kennedy Airport, a request sent from his mobile phone may show him the shortest connection. In line with the methodologies described above, the cache 4 of the search platform 3 keeps a number of pre-computed search results which may be ranked in the order of distance between the two locations, while the validation instance 6 keeps current information about traffic jams, road works, etc., and may e.g. have the information that the shortest connection is currently not useable due to road maintenance work. In response to the request, the driver is provided not only with the current information that the shortest connection is currently not usable (meaning that this first-ranked search result is "invalid"). The driver now is also provided with the additional information which alternative route can be currently used, i.e. e.g. the second-ranked route kept by the cache 4. This alternative route may be slightly longer in distance but is currently free, since there is e. g. no roadwork going on or there are no traffic jams which is determined by the validation instance 6 that assesses the second-ranked route to be valid. Therefore, the second-ranked search result—the alternative route—is returned and presented to the driver. In another situation, the shortest connection may still be usable, i. e. not blocked and thereby not invalid, but loaded with a heavy traffic jam. For example, the validation instance 6 returns a time for completing this shortest connection which may be longer than the time needed to pass the alternative route according to the second-ranked search result. The search platform 3 may then return both, the first-ranked search result and the second-ranked search result, but also indicate to the driver's device that the first-ranked result is currently actually slower than the second-ranked result.

FIG. 11 is a diagrammatic representation of the internal component of a computing machine of the client 1, frontend system 2, backend system 5, computation platform 8 or databases. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A video display, an alpha-numeric input device and a cursor control device may be provided as examples of user interface 102. The network interface device 103 connects the computing machine 100 to the other components of the distributed computing system such as the clients 1, frontend system 2, backend system 5 or further components such as databases.

Computing machine 100 also hosts the cache 107. The 107 may store the received database tables also in a cache. The cache 107 within the present embodiments may be composed of hardware and software components that store the database tables so that future requests for the database tables can be served faster than without caching. There can be hardware-based caches such as CPU caches, GPU caches, digital signal processors and translation lookaside buffers, as well as software-based caches such as page caches, web caches (Hypertext Transfer Protocol, HTTP, caches) etc. Client 1, frontend system 2, backend system 5, computation platform 8 or databases may comprise of a cache 107. Computation platform 8 starts data processing such as decoding the received database tables, elimination of errors residing in the database tables by removing e, g, redundant data sets from the database tables or data sets with missing entries. Furthermore, the database tables are brought into a common data format to ease further processing.

A set of computer-executable instructions (i.e., computer program code) embodying any one, or all, of the methodologies described herein, resides completely, or at least partially, in or on a machine-readable medium, e.g., the main memory 106. Main memory 106 hosts computer program code for functional entities such as database request processing 108 which includes the functionality to receive and process database requests and data processing functionality 109. The instructions may further be transmitted or received as a propagated signal via the Internet through the network interface device 103 or via the user interface 102. Communication within computing machine is performed via bus 104. Basic operation of the computing machine 100 is controlled by an operating system which is also located in the main memory 106, the at least one processor 101 and/or the static memory 105.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

The invention claimed is:

1. A method for handling data in a distributed computing environment, the method comprising:
   storing, in a cache of a frontend system of the distributed computing environment, a plurality of pre-computed search results generated by a backend system of the distributed computing environment from data records stored at the backend system, each pre-computed search result containing a set of parameters having corresponding values, at least first and second pre-computed search results having equal values for a subset of the parameters, and unequal values for a remainder of the parameters;
   receiving, at the frontend system, a request from a client device, the request comprising the equal values for the subset of the parameters;
   in response to receiving the request, retrieving from the cache at least the first pre-computed search result and the second pre-computed search result,
   transmitting a validation inquiry from the frontend system to a validation instance of the backend system, the validation inquiry containing identifiers of the first and second pre-computed search results;
   in response to the validation inquiry, receiving at the frontend system from the validation instance (i) a current validity of the first pre-computed search result indicating whether a first route defined by the first pre-computed search result is available, and (ii) a current validity of the second pre-computed search result indicating whether a second route defined by the second pre-computed search result is available;
   determining, at the frontend system based on the current validities of the first and second pre-computed search results, that the first route is unavailable, and that the second route is available;
   in response to the determination, without requesting generation of further search results by the backend system, (i) returning the second pre-computed search result from the frontend system to the client device in response to the request, and (ii) discarding the first pre-computed search result from the cache at the frontend system.

2. The method according to claim 1, wherein the pre-computed search results comprise a set of ordered search results, wherein the first pre-computed search result is a first-ranked search result and the second pre-computed search result is a second-ranked search result from the set of ordered search results.

3. The method according to claim 1, further comprising, at the frontend system: returning, in response to evaluating that the first pre-computed search result is invalid an indication that the first pre-computed search result is currently invalid.

4. The method according to claim 1, wherein the frontend system comprises a cache manager, the method further comprising, at the cache manager:
   triggering a pre-computation of at least two further pre-computed search results containing the equal values for the subset of parameters, in response to determining that a probability that at least one of the first pre-computed search result or the second pre-computed search result stored at the cache is outdated exceeds a given threshold.

5. The method according to claim 4, wherein determining that a probability that at least one of the first pre-computed search result or the second pre-computed search result stored at the cache is outdated exceeds a given threshold comprises:

calculating an aging value given by $e^{-C(t-t_0)}$;

wherein t denotes a current time or the estimated time of receipt of the first and/or second pre-computed search result at the cache, C denotes an aging rate modelled by a probabilistic model and t0 a timestamp indicating the time when the first and/or the second pre-computed search result was precomputed;

determining whether the aging value is below a threshold value.

6. The method according to claim 4, wherein triggering the pre-computation comprises:

transmitting an indication from the frontend system to the backend system that the first pre-computed search result and/or the second pre-computed search result is invalid; and replacing the first pre-computed search result from the set of search results for the given data record and/or the second pre-computed search result by the further search results.

7. A computing system comprising:

a backend system storing data records and configured to generate search results from the data records;

a frontend system having a cache storing a plurality of pre-computed search results generated by the backend system, each pre-computed search result containing a set of parameters having corresponding values, at least first and second pre-computed search results having equal values for a subset of the parameters, and unequal values for a remainder of the parameters;

the frontend system being arranged to:

receive a request from a client device, the request comprising the common equal values for the first subset of the parameters;

in response to receiving the request, retrieve from the cache at least the first pre-computed search result and the second pre-computed search result for the first data record;

transmit a validation inquiry from the frontend system to a validation instance of the backend system, the validation inquiry containing identifiers of the first and second pre-computed search results;

in response to the validation inquiry, receive from the validation instance (i) a current validity of the first pre-computed search result indicating whether a first route defined by the first pre-computed search result is available, and (ii) a current validity of the second pre-computed search result indicating whether a second route defined by the second pre-computed search result is available;

determine, based on the current validities of the first and second pre-computed search results, that the first route is unavailable, and that the second route is available;

in response to the determination, without requesting generation of further search results by the backend system, (i) return the second pre-computed search result to the client device in response to the request, and (ii) discard the first pre-computed search result from the cache.

8. A non-transitory computer readable medium storing instructions executable by a computing device to:

store, in a cache of the computing device, a plurality of pre-computed search results generated by a backend system from data records stored at the backend system, each pre-computed search result containing a set of parameters having corresponding values, at least first and second pre-computed search results having equal values for a subset of the parameters, and unequal values for a remainder of the parameters;

receive a request from a client device, the request comprising the equal values for the subset of the parameters;

in response to receiving the request, retrieve from the cache at least the first pre-computed search result and the second pre-computed search result;

transmit a validation inquiry to a validation instance of the backend system, the validation inquiry containing identifiers of the first and second pre-computed search results;

in response to the validation inquiry, receive from the validation instance (i) a current validity of the first pre-computed search result indicating whether a first route defined by the first pre-computed search result is available, and (ii) a current validity of the second pre-computed search result indicating whether a second route defined by the second pre-computed search result is available;

determine, based on the current validities of the first and second pre-computed search results, that the first route is unavailable, and that the second route is available;

in response to the determination, without requesting generation of further search results by the backend system, (i) return the second pre-computed search result to the client device in response to the request, and (ii) discard the first pre-computed search result from the cache.

* * * * *